Dec. 19, 1961 C. A. STEINKOENIG 3,013,720

CONCENTRIC DISC CALCULATOR

Filed March 15, 1957 2 Sheets-Sheet 1

INVENTOR.
CHARLES A. STEINKOENIG
BY
McMorrow, Berman & Davidson
ATTORNEYS

Dec. 19, 1961

C. A. STEINKOENIG 3,013,720

CONCENTRIC DISC CALCULATOR

Filed March 15, 1957

2 Sheets-Sheet 2

INVENTOR.
CHARLES A. STEINKOENIG
BY
McMorrow, Berman + Davidson
ATTORNEYS

1

3,013,720

CONCENTRIC DISC CALCULATOR

Charles A. Steinkoenig, 4775 Basil Lane, Cincinnati, Ohio

Filed Mar. 15, 1957, Ser. No. 646,420

1 Claim. (Cl. 235—78)

This invention relates to calculating devices, and more particularly to a calculator of the circular type for computing interest on loans and interest on savings.

The main object of the invention is to provide a novel and improved loan interest and savings interest calculating device which is simple in construction, which is easy to use, and which is compact in size.

A further object of the invention is to provide an improved interest calculator which is inexpensive to manufacture, which is durable in construction, and which enables a person to rapidly and accurately calculate interest amounts on a given principal for a definite period of time.

A further object of the invention is to provide an improved combined loan interest and saving interest calculator which may be employed either to compute the amount of interest on a loan for a definite number of days at a given loan rate of interest, or, if desired, to calculate the amount of interest on a definite sum deposited at a definite date during a six-month period, where the interest rate is a predetermined value.

A still further object of the invention is to provide an improved interest calculator which involves relatively few parts, which provides a reading of an interest amount either for an ordinary loan or for a savings deposit, and which eliminates the necessity of arithmetical calculations in computing interest amounts.

Further objects and advantages of the invention will become apparent from the following description and claims and from the accompanying drawings, wherein:

Figure 1:
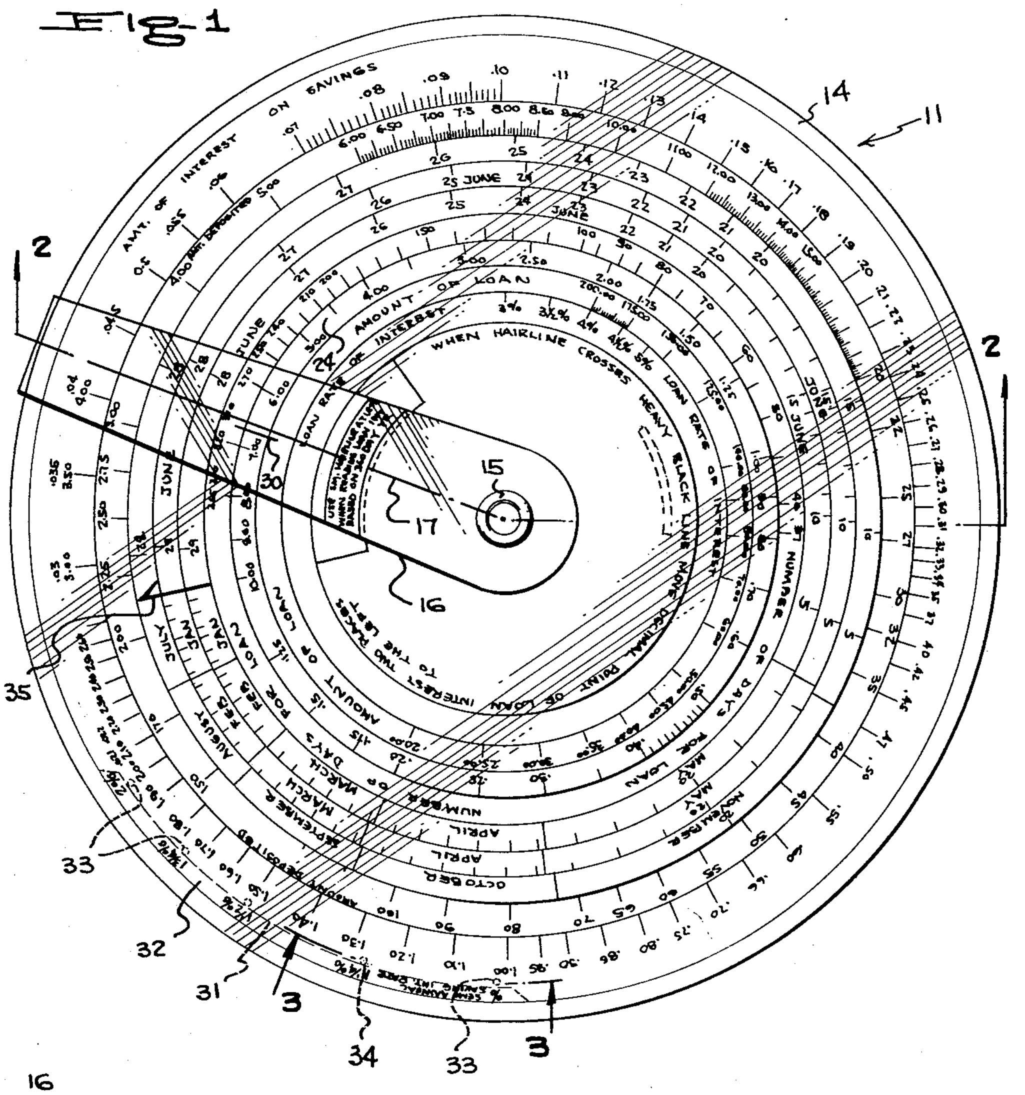
FIGURE 1 is a plan view of an improved combined loan interest and savings interest calculator constructed in accordance with the present invention.

Referring to the drawings, the improved combination loan interest and savings interest calculator is designated generally at 11. The calculator 11 comprises three disc elements, designated at 12, 13 and 14, said disc elements being concentrically and rotatably secured together by a central eyelet member 15. Also rotatably connected to the superimposed disc members by the eyelet member 15 is a transparent index arm 16 which overlies the top disc member 12 and which is provided with a radially extending hairline 17. As shown, the arm 16 is of sufficient length to project slightly beyond the periphery of the disc members, as shown in FIGURE 2.

Figure 2:
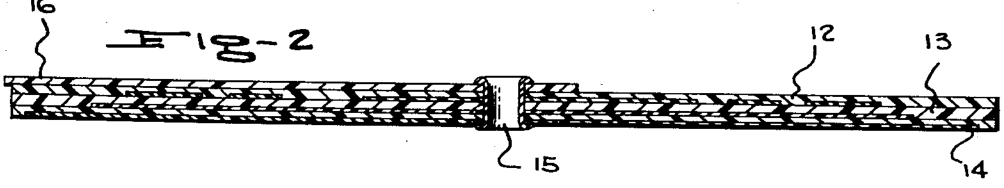
FIGURE 2 is a vertical cross sectional view taken on the line 2—2 of FIGURE 1.
Figure 3:
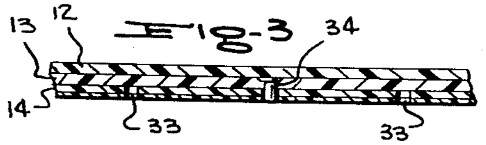
FIGURE 3 is a fragmentary vertical cross sectional view taken on the line 3—3 of FIGURE 1.

The disc members are substantially of equal diameter, as is readily apparent from FIGURE 2. Said disc members are made of suitable transparent material, such as transparent plastic material, so that the intermediate and lower disc members 13 and 14 may be viewed through the upper disc member 12, and the lower disc member 14 is visible through the intermediate and top disc members 13 and 12.

Inscribed on the outer portion of the lower disc member 14 is a circular scale 18, calibrated in amounts of interest on savings deposits. Scale 18 is concentric

Figures 4, 5:
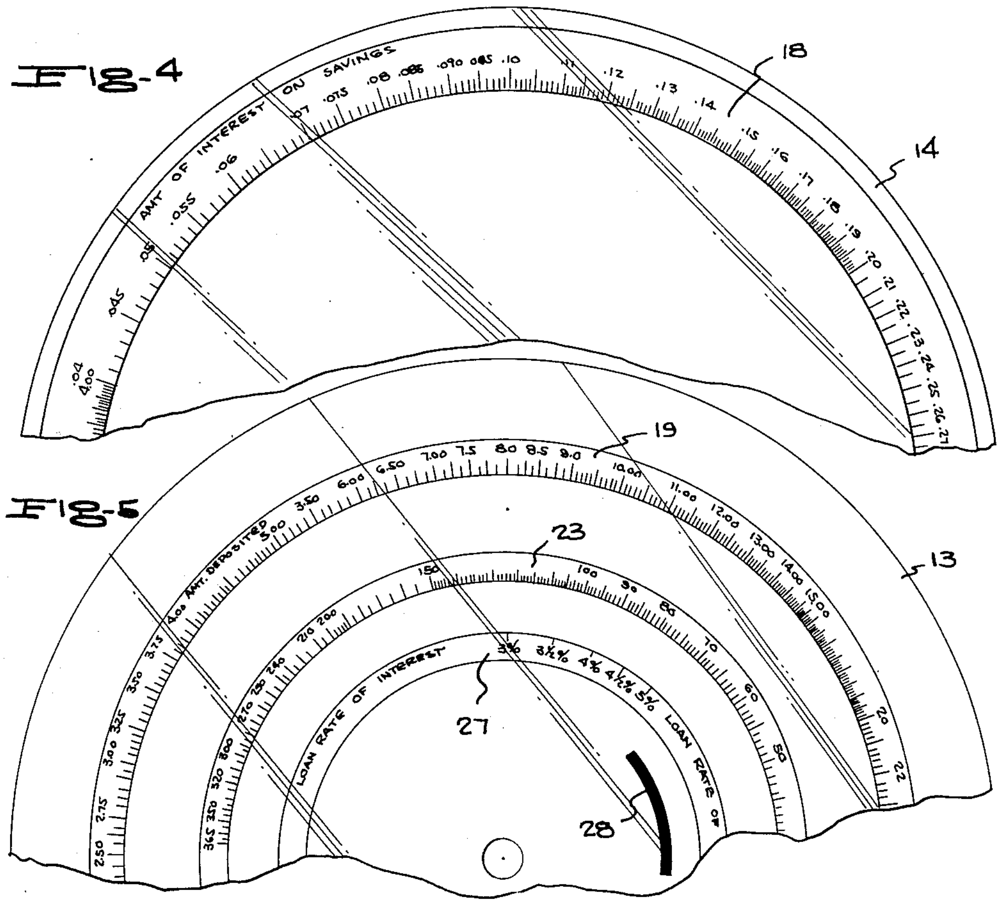
FIGURE 4 is a fragmentary plan view of the bottom disc element employed in the calculator of FIGURE 1.
FIGURE 5 is a fragmentary plan view of the intermediate disc employed in the calculator of FIGURE 1.

2 with the disc member 14 and located adjacent its periphery, as is clearly shown in FIGURE 4.

Inscribed on the intermediate disc member 13 is a circular scale 19, concentric therewith, and calibrated in amount of savings deposited. The scale 19 is located inwardly adjacent to the interest amount scale 18 of the lower disc 14.

Inscribed on the upper disc member 12 concentric therewith and inwardly adjacent to the scale 19 of the intermediate disc 13 are three circular calendar scales 20, 21 and 22, the scale 21 being located inwardly adjacent the scale 20 and the scale 22 being located inwardly adjacent the scale 21. Scale 20 is calibrated in accordance with the normal calendar succession of days for the second half of a year, starting with July 1st and terminating December 31st, the scale running in a counter-clockwise direction, as viewed in FIGURE 1. The intermediate calendar scale 21 is similar to the calendar scale 20 except that it is calibrated in the normal succession of days for the first half of the year, beginning with January 1st and terminating with June 30th, said scale running counter-clockwise, as viewed in FIGURE 1. The inner calendar scale 22 is similar to the intermediate calendar scale 21, except that it is calibrated for a Leap Year wherein the month of February has twenty nine days instead of twenty eight.

Inscribed concentrically on the intermediate disc member 13 inwardly adjacent the inner calendar scale 22 is a circular scale 23 calibrated in number of days, ascending counter-clockwise, as viewed in FIGURE 5.

Figure 6:
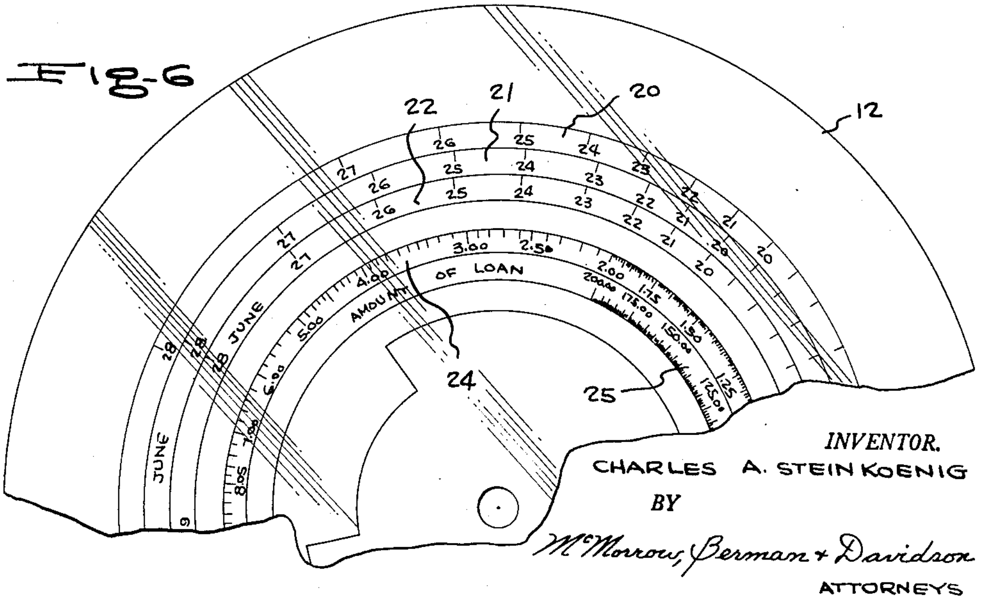
FIGURE 6 is a fragmentary plan view of the top disc member employed in the calculator of FIGURE 1.

Concentrically inscribed on the top disc member 12 inwardly adjacent to the loan duration scale 23 is a circular scale 24 calibrated in amounts of loan interest, the scale ascending in a counter-clockwise direction, as viewed in FIGURE 6.

Concentrically inscribed on the top disc member 12 inwardly adjacent to the amount of loan interest scale 24 is a circular scale 25 calibrated in loan amounts. Scale 25 ascends in a counter-clockwise direction, as viewed in FIGURE 6.

Concentrically inscribed on the intermediate disc member 13 is a circular scale 27 marked off in various loan rates of interest, as shown in FIGURE 5, the loan rates increasing in a clockwise direction, as viewed in FIGURE 5. Scale 27 is the innermost scale of the device and is located inwardly adjacent the loan amount scale 25, as is apparent from FIGURES 5, 6 and 1.

Inscribed on the intermediate disc member 13 inwardly adjacent the loan rate scale 27 is an arcuate line 28 concentric with the disc members and serving to indicate the point at which the decimal point of an interest calculation must be shifted two places to the left when the hairline 17 of the index arm 16 passes the arcuate marker line 28.

The hairline 17 is employed as the index element of the device when loan interest amounts are to be computed on the basis of a three hundred and sixty five day year. When interest amounts are to be computed on the basis of a three hundred and sixty day year, in accordance with certain business customs, an auxiliary index element is employed, comprising a hairline 30 inscribed on the arm 16 parallel to the hairline 17 and displaced laterally therefrom a short distance, as shown in FIGURE 1. The hairline 30 is located over the loan interest amount scale 24 of the upper disc member 12, so that the hairline 30 may be utilized in computing the loan interest amount on the basis of a three hundred and sixty day year instead of the three hundred and sixty five day year.

As shown in FIGURE 4, the interest amount on savings scale 18 runs in a clockwise direction, as does the savings amount deposited scale 19 inwardly adjacent thereto on the intermediate disc 13. The loan duration scale 23 runs counter-clockwise and the loan rate of interest scale 27 runs clockwise. As above mentioned, the calendar scales 20, 21 and 22 run counter-clockwise. The loan interest amount scale 24 runs counter-clockwise, and the loan amount scale 25 also runs counter-clockwise.

The intermediate disc member 13 is formed at its periphery with a notch 31 of substantial length which is of uniform radial depth and which overlies and provides a clear view of a semi-annual savings interest scale 32 inscribed concentrically on the bottom disc member 14. Said bottom disc member 14 is provided with spaced apertures 33 located at equal distances from the common axis of the disc members and adjacent to the arcuate notch 31. Secured to the intermediate disc member 13 is a depending pin element 34 which is engageable in a selected aperture 33, the disc members being sufficiently flexible so that the pin member 34 may be readily disengaged from one aperture 33 and placed in another, whereby the disc members 13 and 14 may be releasably secured in relatively rotated positions, corresponding to different semi-annular savings interest rates. The calibrations of the scale 32 are located adjacent to the respective apertures 33, as shown in FIGURE 1, so that a specific semi-annual savings interest rate may be selected by engaging the locking pin 34 in the corresponding locking aperture 33.

In using the device to compute loan interest for any amount for any number of days, the inner portion of the device is employed as follows: The upper disc member 12 is rotated relative to the intermediate disc member 13 to place the amount of loan, on the scale 25 adjacent to the loan rate of interest, as shown on the scale 27. The index arm 16 is then rotated to place the hairline 17 over the number of days of the loan, as shown on the circular scale 23. The amount of loan interest may then be read by observing the position of the hairline 17 on the circular scale 24.

As above explained, if the computation is on the basis of a three hundred and sixty day year, the loan interest is read from the auxiliary short hairline 30 instead of from the main hairline 17. Thus, in the example illustrated by FIGURE 1, a loan of $200.00 at 4% for 300 days will earn $6.58 in interest on the basis of a 365 day year, and will earn $6.67 in interest on the basis of a 360 day year period.

The interest at the end of a six month period, namely, a half year, based on a savings deposit during the preceding six month period and at a given rate of savings interest is computed as follows: The intermediate disc member 13 is adjusted relative to the bottom disc member 14 in accordance with the proper semi-annual savings interest rate by engaging the locking pin 34 in the correct savings interest rate aperture 33. The device may be left at this setting until the savings interest rate is changed. The upper disc member 12 is then adjusted so that an index marker 35 at the beginning of the calendar scales 20, 21 and 22 is located at a position relative to the savings amount deposited scale 19 of the intermediate disc member 13 corresponding to the savings amount deposited. The index arm 16 is then rotated until the hairline 17 is over a point on the appropriate calendar scale 20, 21 or 22 corresponding to the date of the savings deposit. The reading given by the hairline 17 on the amount deposited scale 19 will then consist of the average deposit for a six-month term. The reading on the savings interest scale 18 will then give the amount of interest on the savings deposit for the preceding six-month period earned by this average deposit, and hence earned by the actual deposit.

Thus, with the setting illustrated in FIGURE 1 as an example, the semi-annual savings interest rate is one and one-quarter percent. The index marker 35 is set at an amount deposited of two-hundred and fifteen dollars. Suppose the deposit had been made on June 1st. Then hairline 17 would be set to June 1st on scale 21, which would show an "average" deposit of thirty-seven dollars (this is the amount which would yield the same interest for a six month period as the two-hundred and fifteen dollars for the period deposited, ending June 30th). The amount of interest then shown on scale 18 by hairline 17 would be forty-six cents (which is one and one-quarter percent of the "deposit of thirty-seven dollars.")

Because of the arrangement of the loan interest scale 24 which respect to the amount of loan scale 25 and the loan duration scale 23, under certain conditions of computation, the loan interest values derived on scale 24 will be one-hundred times the correct value. This condition occurs when the hairline 17 crosses the decimal point location index line 28.

As above mentioned, when the hairline 17 crosses the decimal point location index line 28, the decimal point of the amount indicated on the loan interest scale 24 must be moved two places to the left.

While a specific embodiment of an improved loan interest and savings interest calculator has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A savings interest calculator comprising a first flexible transparent disc element, a circular calendar scale inscribed concentrically on said first disc element, a second flexible transparent disc element rotatably and concentrically secured to said first disc element, a circular savings amount deposited scale inscribed concentrically on said second disc element and arranged adjacent to said calendar scale, a third disc element rotatably and concentrically secured to said first and second disc elements, a circular interest amount scale inscribed concentrically on said third disc element, a savings interest scale on the peripheral portion of said third disc element, said second disc element being formed at its periphery with a notch of substantial length and uniform radial depth which overlies said savings interest scale, said second and third disc elements being rotatably adjustable relative to each other in accordance with different savings interest rates, a depending pin element on the peripheral portion of the second disc element adjacent said notch, said third disc element being formed with a plurality of apertures located in accordance with respective different semi-annual savings interest rates and spaced to receive said pin element at adjusted positions of the second and third disc elements corresponding to said different savings interest rates, and a radial index arm pivoted to the common axis of said disc elements and extending radially over said calendar scale and savings interest amount scale.

References Cited in the file of this patent

UNITED STATES PATENTS

| | | |
|---|---|---|
| 1,075,124 | Scheibli | Oct. 17, 1913 |
| 2,301,033 | Findlay | Nov. 3, 1942 |
| 2,373,671 | Feicht | Apr. 17, 1945 |
| 2,489,664 | Norwood | Nov. 29, 1949 |